United States Patent [19]
Fitzgerald

[11] Patent Number: 5,131,457
[45] Date of Patent: Jul. 21, 1992

[54] PROTECTION SYSTEM FOR HEAT PIPE AIRHEATERS

[75] Inventor: Francis D. Fitzgerald, Phillipsburg, N.J.

[73] Assignee: Foster Wheeler Energy Corporation, Clinton, N.J.

[21] Appl. No.: 777,771

[22] Filed: Oct. 7, 1991

[51] Int. Cl.⁵ ............... F28D 15/02; G05D 23/00
[52] U.S. Cl. ...................... 165/34; 165/100; 165/134.1; 165/909; 432/179; 122/DIG. 1
[58] Field of Search .......... 165/34, 134.1, 103, 165/909, 100; 432/179; 122/DIG. 1

[56] References Cited

U.S. PATENT DOCUMENTS

| | | | |
|---|---|---|---|
| 3,968,787 | 7/1976 | Basiulis | 165/134.1 |
| 4,129,176 | 12/1978 | Heyn et al. | 165/34 |
| 4,245,147 | 1/1981 | Cummings et al. | 165/103 |
| 4,299,272 | 11/1981 | Bagno | 165/103 |
| 4,426,959 | 1/1984 | McCurley | 165/104.21 |

Primary Examiner—Albert W. Davis, Jr.
Attorney, Agent, or Firm—Marvin A. Naigur

[57] ABSTRACT

A plant having a combustion chamber can employ at least one heat pipe. The heat pipe is mounted to exchange heat between flue gas in a flue gas path and combustion air in a combustion air path. A protection system has a dual passage for separately conducting the flue gas and the combustion gas. The dual passage has a wall separating the flue gas path from the combustion air path. The heat pipe is mounted through the wall. A sensor is mounted about the heat pipe for providing a temperature signal signifying the temperature at the heat pipe. A damper is coupled to the sensor and communicates with the dual passage for mixing relatively cooler air with the flue gas in the dual passage, upstream of the heat pipe, in response to the temperature signal violating a predetermined limit.

18 Claims, 3 Drawing Sheets

PROTECTION SYSTEM FOR HEAT PIPE AIRHEATERS

BACKGROUND OF THE INVENTION

The present invention relates to protection systems for preventing overheating of heat pipe airheaters and, in particular, to systems having a dual passage with heat pipes mounted in a wall separating the flow paths of the dual passage.

A heat pipe is a device that achieves a high thermal conductance by taking advantage of the large latent heat of vaporization/condensation of a working fluid. An internal working fluid can absorb heat at the evaporator end of the pipe by vaporizing. Vapor thus generated moves to the condenser end where the fluid surrenders heat and condenses. A thermo-syphon heat pipe uses gravity, buoyancy and vapor pressure forces to transport the phases of the working fluid. This type of heat pipe normally requires the evaporator end to be lower than the condenser end. The working medium cycles because the lighter vapor is buoyed and the condensed liquid falls. Alternatively, apparatus can be included in the heat pipe to transport the working medium by capillary action using gauze, wire mesh or other suitable materials.

The heat pipe can be used in various applications, such as recovering waste heat from a plant to heat air for various purposes including heating a living space. The heat pipes can also be used in steam condensers wherein cooling air is blown over the condenser end of the heat pipe. In flue gas reheaters, heat can be extracted by a heat pipe from flue gas prior to entering a scrubber module. The heat is returned to the flue gas exiting the scrubber to provide sufficient buoyancy as the gas enters the atmosphere. For airheater applications, heat is transferred from the exhaust gas of the furnace or boiler to the incoming combustion air.

Heat pipe airheaters utilize synthetic fluids and sometimes corrosion inhibitors that disassociate or break down at elevated temperatures. Thus, if the hot gas flowing over the evaporator end exceeds design limits or if the gas to air flow rate is substantially greater than design, overheating, degraded performance and premature failure can occur.

In pulverized-coal-fired boilers, oil or other fossil fuel may be used to start the boiler before the furnace is sufficiently hot to accept pulverized coal. Combustion air or primary air should not pass through the coal pulverizing units during this start up phase because of the danger of explosion from the dispersing of coal dust in the pulverizer. Since primary air does not pass through the airheater but hot flue gas does, the airheater can overheat.

Furthermore, even when the boiler is operating in its normal mode, the airheater can become unbalanced and overheat. During normal operation on a pulverized coal unit, convection surfaces may become fouled. The gas temperature entering the heat exchanger may therefore become substantially greater than designed. For circulating fluidized bed boilers, high gas temperature can occur if high particle carry over occurs at the cyclone. Any of these events may lead to deterioration of the heat transfer fluid in the evaporating end of the heat pipe in an airheater.

Heat pipe air heaters as used on fossil-fired utility boilers for exchanging heat between flue gas and combustion air, are designed to have minimum leakage from flue gas to combustion air path. This design criteria is important when there is a large pressure differential, as occurs between the primary air and gas on pulverized-coal-fired units and on fluidized bed boilers. Efficiency considerations make it normally desirable to reduce air leakage across the airheater to reduce the power required for the primary air blower; as well as reducing precipitator and baghouse requirements.

In U.S. Pat. No. 4,015,932 a combustion air preheater has a temperature sensor at the downstream end of the air passage. The sensed temperature can operate a venting valve to increase the air flow through the air passage thereby affecting the air velocity and temperature. This reference, however, does not discuss cross feeding air from one side of a heat exchanger to the other.

U.S. Pat. No. 4,449,569 shows an air preheater for a furnace in which temperature is sensed in the air passage and used to regulate an induced draft fan. Again, this reference does not show cross feeding air from one side of an exchanger to the other. See also U.S. Pat. Nos. 4,029,465; 4,040,477; 4,589,844; and 4,784,069.

Accordingly, there is a need for a system for protecting airheaters in a way that is simple and effective.

SUMMARY OF THE INVENTION

In accordance with the illustrative embodiments, demonstrating features and advantages of the present invention, there is provided a protection system in a plant having a combustion chamber and employing at least one heat pipe. The heat pipe is mounted to exchange heat between flue gas in a flue gas path and combustion air in a combustion air path. The protection system has a dual passage for separately conducting the flue gas and the combustion air. The dual passage has a wall separating the flue gas path from the combustion air path. The heat pipe is mounted through that wall. A sensing means is mounted about the heat pipe for providing a temperature signal signifying the temperature at the heat pipe. A damper means is coupled to the sensing means and communicates with the dual passage for mixing relatively cooler air with the flue gas in the dual passage, upstream of the heat pipe, in response to the temperature signal violating a predetermined limit.

In a preferred embodiment, an air preheater has two side-by-side passages separated by a center wall through which a heat pipe is mounted. In one embodiment, heat pipe halves are mounted on either side of apertures in the center wall. The pipe halves can be complementary; namely, a condenser end and an evaporator end. Preferably, many heat pipes are mounted in the center wall.

In one application, the heat pipe is used to exchange heat from the hot exhaust gas of a boiler or furnace to the primary combustion air. Preferably, relatively cool combustion air is bypassed through a damper to the upstream end of the flue gas path in the flue gas exchanger. Bypassing the air reduces the temperature in the flue gas path of the heat exchanger to prevent overheating and damage to the heat pipes. Preferably, air is bled from the downstream end of the combustion air path to the upstream end of the flue gas path. Alternatively, air at the upstream end of the combustion air path can be bled to the upstream end of the flue gas path.

In still another embodiment, air can be diverted from a midpoint on one side of the airheater to a midpoint on the other side of the airheater. Alternatively, the damper can be used to inject relatively cool ambient air to the upstream end of the flue gas path. Extracting air from a midpoint of the air side of the airheater protects the cold end pipes. The condensing end during restart, produces the required leakage air flow, provides a fast response, and provides a positive primary air flow path during restart.

In preferred embodiments, one or more of the heat pipes have temperature sensors such as a thermocouple mounted on them. For example a thermocouple can be mounted at the evaporating end of the heat pipe. Significantly, the thermocouple can be used to regulate the bypass damper so that the temperature in the airheater is moderated. Preferably, the metal temperatures of the heat pipe tubes in the different zones would be monitored at the two ends, preferably in a zero heat flux zone. Any zone indicating excessive temperatures, would produce a command signal to operate a damper to allow combustion air to pass from one side of the heat exchanger to the other, thereby mixing cooler combustion air with the relatively hot flue gas. Preferably, the bypass should not work if a fire is detected.

BRIEF DESCRIPTION OF THE DRAWINGS

The above brief description as well as other objects, features, and advantage of the present invention will be more fully appreciated by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENTS

Figure 1:
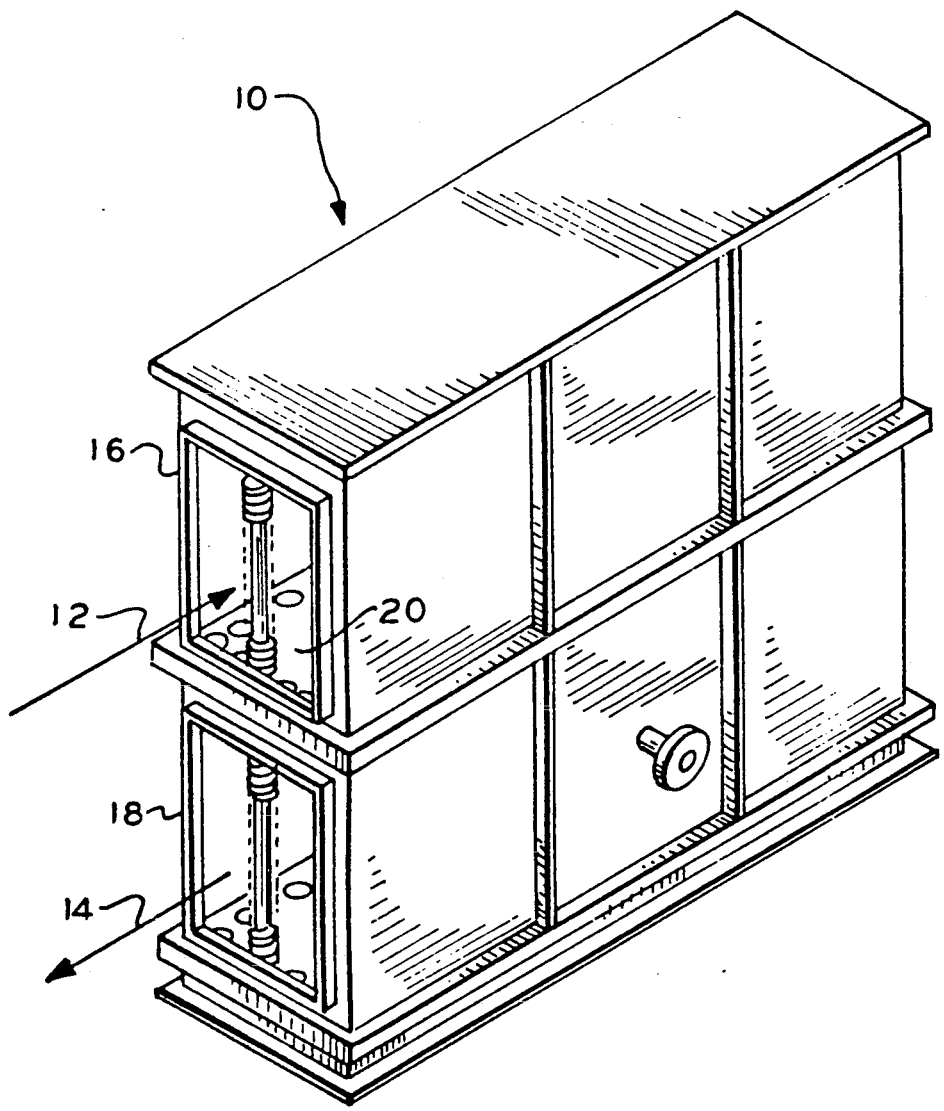
FIG. 1 is perspective view of an airheater used in a plant and suitable for employing the protection system of the present invention.
Figure 2:
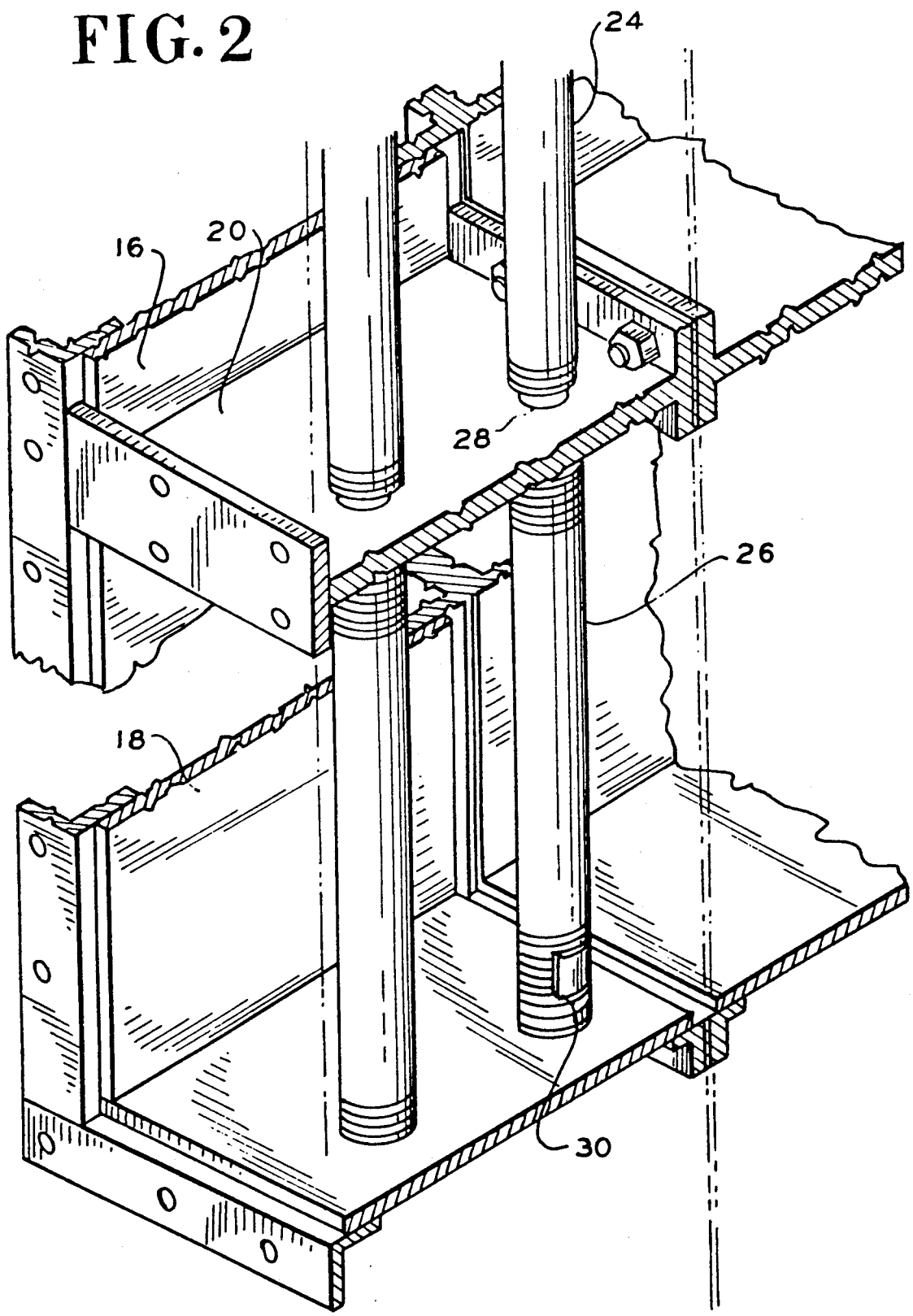
FIG. 2 is a detailed internal view of the airheater of FIG. 1 with sections broken away to show a sensing means operating with the protection system.

Referring to FIGS. 1 and 2, a dual passage is shown herein as an airheater 10 having a combustion air path 12 and a flue gas path 14. The paths 12 and 14 are enclosed by passages 16 and 18, respectively, each separated by a common separating wall 20. As illustrated, airheater 10 can be a module that can be bolted to like modules in the field. The number of modules employed depends upon the application.

The illustrated heat pipes each have a condenser end 24 and an evaporator end 26. Each of the pipes 24, 26 have welded finning for effectively increasing the surface area and the thermal transfer capacity of the pipes. The heat pipes can be numerous and can be arranged in a rectangular pattern adjusted to fit the available space.

The heat pipe ends 24 and 26 are welded on opposite sides of a hole 28 formed in separating wall 20. Heat pipe ends 24 and 26 can be joined by first inserting the air side tube 24 into a slightly oversized penetration. The tube can then protrude slightly past the gas side of the wall 20 and then be expanded into place. Because the expansion is slight, only a minimum of cold work is performed on the tube end. The air side tube 24 is then welded to wall 20 on the gas side of wall 20. The gas side tube 26 is inserted into the air side tube arrangement approximately the thickness of the divider plate. The two ends 24 and 26 are then welded together and the weld leak tested. Since the weld that accomplishes the seal is made on the gas side, the front face of the weld that is subjected to the harsher gas side environment is readily inspectable. This arrangement also protects the pipes/wall crevices from the harsh gas environment.

The heat pipes can be filled with the working medium prior to welding them together. End caps can be welded to the heat pipes which permit each pipe to be evacuated and filled with a premeasured charge of working fluid. The composition of the working fluid depends upon the particular application. Preferably, the fluid is a non-toxic hydrocarbon for which considerable test data and operating experience have been assembled. The tubes are sealed and leak tested under vacuum conditions prior to a second final sealing.

In FIG. 2 a sensing means is shown herein as a pad-type thermocouple 30 welded to the lower portion of the evaporator end 26 of the heat pipe. The thermocouple 30 can be welded directly to the fins or, preferably, directly to the pipe at a location where the fins are absent or cut away. Similar thermocouples can be welded to the bottom of the evaporating end of the other heat pipes. In some embodiments, additional thermocouples may be placed on different locations of the evaporator end and the condenser end of the heat pipe. In a highly monitored embodiment, multiple transducers will be attached to each of the two ends of the heat pipe. Preferably, the metal temperatures of the heat pipe tubes in the different zones would be monitored at the two ends, preferably in a zero heat flux zone.

Figure 3:
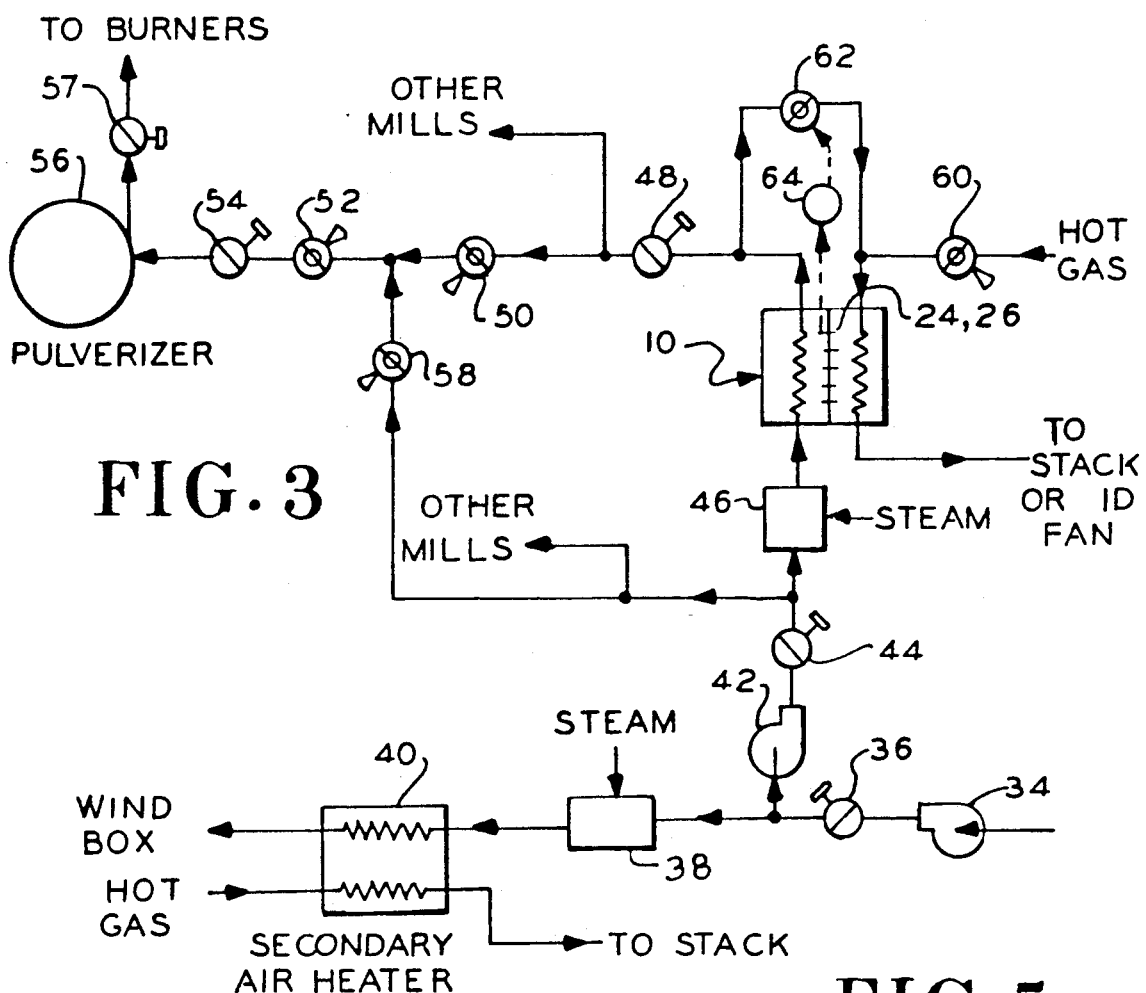
FIG. 3 is a schematic diagram showing the protection system in a pulverized-coal-fired boiler.

Referring to FIG. 3, a forced draft fan 34 communicates through an isolation damper 36 to the inlet of a steam coil heater 38. The outlet of steam coil heater 38 flows through the cold side of a heat exchanger 40 to the wind box of a pulverized-coal-fired boiler. Flowing through the hot side of the exchanger 40 is flue gas. This flue gas preheats the air flowing to the wind box to enhance the efficiency of combustion.

Some of the air from the forced draft fan 34 feeds a primary air blower 42 whose output passes through isolation damper 44 to the inlet of a steam coil heater 46. The outlet of steam coil heater 36 flows through the cold side of previously mentioned airheater 10. The outlet of the cold side of airheater 10 flows through an isolation damper 48, throttling dampers 50 and 52 and isolation damper 54 to a coal pulverizer 56, whose output is delivered to the combustion chamber of the coal fired boiler through damper 57. A throttle bypass damper 58 can bypass the cold side of airheater 10 and steam coil 46, as illustrated. The air at the outlet of isolation dampers 44 and 48 can be connected in parallel to other coal pulverizers.

Hot combustion gas from the boiler flows through throttling damper 60 through the hot side of airheater 10 and from there to the stack or induced draft fan of the plant. A damping means is shown herein as throttling damper 62, connected between the downstream end of the combustion air path (cold side) of airheater 10 and to the upstream end of the flue gas path (hot side) of airheater 10. Preferably, the feed from bypass damper 62 into the hot combustion gas would employ sparge pipes for equal air distribution and mixing. To prevent erosion, the air should be directed upstream and not directly at downstream heat pipes.

The controlled leakage damper 62 is supplied in a duct connecting the air outlet duct, upstream of the air isolation damper 48. The damper 62 is a relatively tight shut-off damper; preferably a butterfly with pneumatic actuation and having metal or fabric seats.

When the gas temperature measured at the airheater gas inlet via temperature transmitter/controller 64 is greater than the design limit, then damper 62 will modulate to blend hot air with the hot gas until the blended gas temperatures are reduced to acceptable levels. Damper 62 can also be opened during fan restart operations to provide a positive primary air flow path prior to starting mills or fluidizing beds. This prevents overheating of the air during restarts.

Schematically illustrated temperature transmitter/controller 64 is shown receiving an input from the previously mentioned thermocouple (thermocouple 30 of FIG. 2) on heat pipe 24, 26 in airheater 10. The thermocouple output is converted to an electrical or pneumatic signal that can operate bypass throttling damper 62. Temperature transmitter/controller 64 can be arranged to change the damper position discretely, that is, abruptly from an open to a closed position, when the measured temperature is an acceptable range. Alternatively, the temperature transmitter/controller 64 can gradually vary the setting of damper 62 over a predetermined temperature range. The specific temperature trigger points or modulation range is chosen depending upon the design temperature of the heat pipes, the working fluid in the heat pipe, the design temperature of the air heaters, the expected gas and air flows through the airheater and other appropriate design criteria. As an example, the thermocouple can be designed to open and close the bypass throttling damper 62 when temperatures are sensed in the range of 600° to 750° F. The temperature chosen will depend primarily on the breakdown characteristics of the working medium inside the heat pipes 24, 26.

In some embodiments, a number of thermocouples can be operating in concert. In this instance, the transmitter/controller 64 can respond to the thermocouple producing a signal indicating the hottest temperature. Alternatively, the controller 64 can respond to the average of the signals or some other processed form of the thermocouple signals. In some embodiments, the thermocouple signal would need to indicate a violation of a preset limit for a predetermine time period, such as 3 minutes, to avoid responding unnecessarily to thermal transients. In some embodiments, transmitter/controller 64 could employ an analog to digital converter for converting the continuous temperature signal into a digital signal. Then the signal could be processed by a microcomputer or other digital circuit. Alternatively, an analog controller can be used instead.

Figure 4:
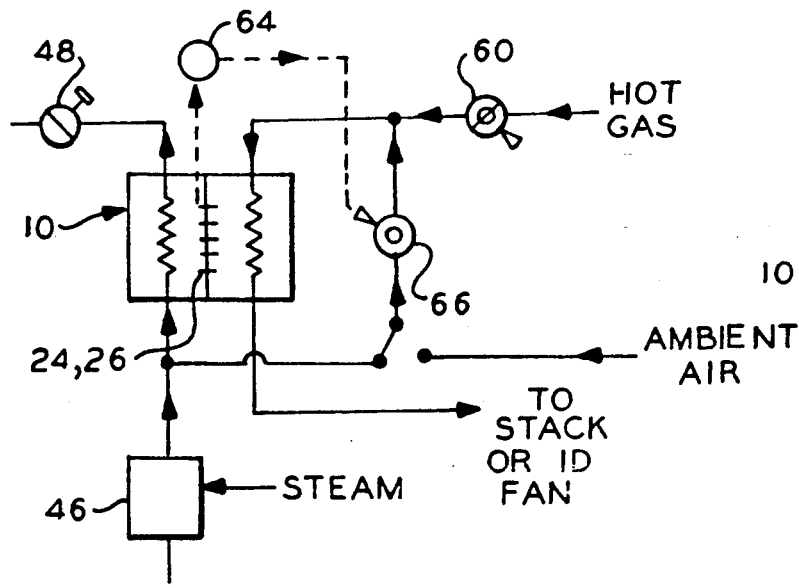
FIG. 4 is a partial schematic diagram showing an alternate connection to the airheater of FIG. 3.

Referring to FIG. 4, previously described are showing bearing identical reference numerals and are connected in the same way unless noted otherwise. In this embodiment bypass throttle damper 66 is shown connected between the upstream end of the combustion air path of airheater 10 and the upstream end of the flue gas path of airheater 10. This arrangement brings colder air to the hot side of airheater 10, but does not allow air to flow at all in the cold side when the coal pulverizer is shut down and no air flows through valve 48. In this arrangement (and other arrangements), the primary air fan supplies combustion air at a pressure which is greater than prevalent on the gas side of the system.

Here cold primary air from upstream of the airheater 10 is transported by a duct and damper 66 to the gas inlet of airheater 10. This embodiment features a fast reduction in gas inlet and gas outlet temperature with a minimal amount of controlled leakage air. As with the prior embodiment, damper 66 can be opened during restart to provide a positive primary air flow path prior to starting mills or fluidizing beds. This embodiment minimizes the amount of leakage air required for gas temperature attemporation, but does not provide an airflow through the air side of the airheater 10 when the air isolation damper 48 is closed.

An implicit alternate embodiment is illustrated in FIG. 4 in that the inlet of valve 66 may be switched to receive ambient air instead of the air at the upstream end of the combustion air path of airheater 10. In this alternate situation, the ambient air provides the advantage that the forced draft fan and primary air fan is not burdened with the requirement of supplying air for the purposes of moderating the temperature in the airheater. This particular arrangement is useful for units utilizing an induced draft fan. For such installations, the pressure in the gas flue is below ambient pressure. Damper 66 can leak cold ambient air into the gas inlet to reduce the gas temperature entering the airheater 10. Thus damper 66 can be used during restart and at higher loads to protect the airheater 10 from overheating. This embodiment, however, does not necessarily provide a positive flow path from primary air flow.

Figure 5:
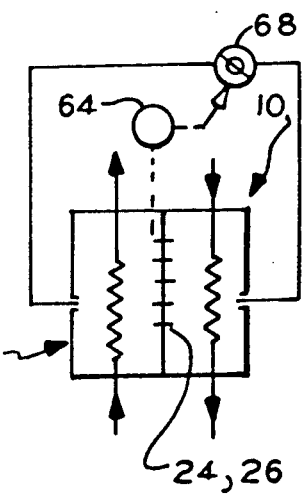
FIG. 5 is a partial schematic diagram showing still another alternate connection to the airheater of FIG. 3.

Referring to FIG. 5, bypass throttling damper 68 is shown connected between a midpoint on the air side of airheater 10 to a midpoint on the gas side of airheater 10. This arrangement will ensure an airflow through the cold end of the air side of the airheater as well as attemporating the gas. This arrangement further protects the cold end pipes during restart, reduces the required leakage airflow, provides a faster response, and provides a positive primary air flow path during restart.

In all arrangements of FIGS. 3-5, the primary variable is the gas or metal temperature measured at the inlets of the gas side of the airheater 10, or at intermediate points throughout the gas side of the airheater. The temperature is preferably measured on the heat pipe although the gas stream itself can be measured in some embodiments. Since the synthetic fluid and/or corrosion inhibitors inside the heat pipes will typically be different at different tubes, the maximum permitted gas or metal temperature will vary with tube row. Alternatively, the temperature of tee heat transfer fluid within the heat pipe tubes can be utilized as the primary control variable. This temperature can be measured with good accuracy by measuring the tube metal temperature in the zones of null heat flux, such as at the tube ends or at the heater partition plate.

During restart periods, the by pass throttling damper can be programed to open to hold the preset minimum required primary airflow prior to starting the mills or fluidizing beds.

To facilitate an understanding of the principles of the foregoing apparatus the operation of the system of FIG. 3 will be briefly described (the operation of the systems of FIGS. 4 and 5 will be similar). Ambient air (e.g., 80° F.) is pressurized to +15" $H_2O$ in the forced draft (FD) fan 34 and passes through isolation damper 36. 80% of this air passes through the secondary air steam coil preheater 38 and secondary airheater 40 into the windbox, during those periods when coal is being fired. If the boiler load is so low that coal cannot be fired, then 100% of the air from the FD fan 34 will be used as secondary air.

20% of the forced draft fan air is fed to the primary air (PA) fan 42. The air is further pressurized to a pressure +55" H2O and passes through isolation damper 44. A small fraction of this air (e.g., 10%) passes through valve 58 and is used as cold tempering air, to prevent overheating of mills 56. (Each mill has a tempering air throttling damper 58.) The remainder of the primary air (e.g., 90%) passes through the primary air steam coil air preheater 46 and the primary airheater 10.

During normal coal firing periods, the primary air is heated in airheater 20, flows through isolation damper 48, and is distributed to each mill by the action of throttling dampers 50 and 52.

At low boiler loads (below 20% of full load), it is generally not feasible to burn coal. During these low load periods, fuel oil is burned, and the primary air system is isolated. Specifically, the PA fan 42 is off, and isolation dampers 44, 48 and 54 are closed. It is generally not permissible to pass primary air through idle coal mills to prevent their overheating, reduce the mill fire and explosion potential and to avoid extinguishing the small start-up ignitor flame in the burner throat (not shown).

During these low load periods, the hot gas throttling damper 60 is closed. However, throttling dampers are not tight shut off dampers, and a substantial amount of hot gas will leak into airheater 10. If this gas temperature exceeds 350° F. while there is no air flow through the air side of airheater 10, then there is a potential to develop accelerated decomposition of the corrosion inhibitors installed within the low temperature heat pipe tubes. Since these heat pipe tubes use extraordinarily thin walls, the loss of activity of the corrosion inhibitors implies a very short component life for these low temperature heat pipes.

To prevent the excessive heat build up, temperature transmitter/controller 64 senses the excessive heat and opens bypass throttling damper 62. Consequently, cooler air from the cold side of airheater 10 can pass into the gas side. Thus, overheating conditions are effectively corrected. Damper 62 can be used during both low load overheating events, when low temperature pipes are endangered, and during high load overheating events when the high temperature pipes are also endangered. For low load conditions when the damper 44 is closed, the system can intentionally provide leakage to sustain the cold air flow through airheater 10. Alternatively, the damper 44 can be designed to close partially or have designed into it a specific amount of leakage to sustain the cold air flow. It may be preferred to start the primary air fan at low loads to provide the required cold air flow.

It is to be appreciated that various modifications may be implemented with respect to the above described preferred embodiments. For example, airheaters of various types employed in different applications are contemplated. Additionally, temperature may be sensed by thermistors or other transducers, depending upon the application. Also the temperature transmitter/controller can employ an analog or digital computer and can also have a network for averaging the temperature signals or processing the temperatures, as appropriate for the particular applications. Additionally, the size, spacing and type of heat pipes employed can be varied depending upon the installation. Also, the position and angle of the heat pipes can be changed depending upon the type of heat pipe and the operating environment.

Obviously many modifications and variations of the present invention are possible in light of the above teachings. It is therefore to be understood that within the scope appended claims, the invention may be practiced otherwise than as specifically described.

I claim:

1. In a plant having a combustion chamber and employing at least one heat pipe mounted to exchange heat between flue gas in a flue gas path and combustion air in a combustion air path, a protection system comprising:
   a dual passage for separately conducting said flue gas and said combustion air, and having a wall separating said flue gas path from said combustion air path, said heat pipe being mounted through said wall;
   sensing means mounted about said heat pipe for providing a temperature signal signifying the temperature at said heat pipe; and
   damper means coupled to said sensing means and communicating with said dual passage for mixing relatively cooler air with said flue gas in said dual passage upstream of said heat pipe, in response to said temperature signal violating a predetermined limit.

2. A protection system according to claim 1 wherein said damper means connects between the downstream end of said combustion air path in said passage and the upstream end of said flue gas path in said passage.

3. A protection system according to claim 1 wherein said damper means connects between the upstream end of said combustion air path in said passage and the upstream end of said flue gas path in said passage.

4. A protection system according to claim 1 wherein said damper means connects between: (a) about a central point between the upstream end and the downstream end of said combustion air path in said passage, and (b) said flue gas path in said passage.

5. A protection system according to claim 1 wherein said damper means connects between: (a) about a central point between the upstream end and the downstream end of said combustion air path in said passage, and (b) about a central point between the upstream end and the downstream end of said flue gas path in said passage.

6. A protection system according to claim 1 wherein said damper means is operable to mix said relatively cooler air with said flue gas upon said sensing means providing said temperature signal at a magnitude signifying a temperature at said heat pipe in excess of a predetermined value.

7. A protection system according to claim 6 wherein said sensing means is mounted on one end of said heat pipe.

8. A protection system according to claim 7 wherein said sensing means is mounted on the hotter end of said heat pipe.

9. A protection system according to claim 6 wherein said damper means connects between the downstream end of said combustion air path in said passage and the upstream end of said flue gas path in said passage.

10. A protection system according to claim 6 wherein said damper means connects between the upstream end of said combustion air path in said passage and the upstream end of said flue gas path in said passage.

11. A protection system according to claim 6 wherein said damper means connects between: (a) about a central point between the upstream end and the downstream end of said combustion air path in said passage, and (b) said flue gas path in said passage.

12. A protection system according to claim 1 wherein said plant employs a plurality of heat pipes for exchanging heat between flue gas in said flue gas path and combustion air in said combustion air path, said plurality of heat pipes being mounted through said wall of said dual passage.

13. A protection system according to claim 12 wherein said sensing means comprises a plurality of sensors separately mounted on corresponding ones of said plurality of heat pipes, said damper being coupled to said sensors and responsive to one of them violating said predetermined limit.

14. A protection system according to claim 13 wherein said sensors are mounted on one end of said heat pipes.

15. A protection system according to claim 14 wherein said sensors are mounted on the hotter end of said heat pipes.

16. A protection system according to claim 15 wherein said damper means connects between the downstream end of said combustion air path in said passage and the upstream end of said flue gas path in said passage.

17. A protection system according to claim 15 wherein said damper means connects between the upstream end of said combustion air path in said passage and the upstream end of said gas path in said passage.

18. A protection system according to claim 15 wherein said damper means connects between: (a) about a central point between the upstream end and the downstream end of said combustion air path in said passage, and (b) said flue gas path in said passage.

* * * * *